(12) United States Patent
Bianchini et al.

(10) Patent No.: US 7,841,779 B1
(45) Date of Patent: Nov. 30, 2010

(54) FIBER OPTIC MODULE RELEASE MECHANISM

(75) Inventors: Gioni Bianchini, Sunol, CA (US); Iggoni Sunga Fajardo, Sunol, CA (US)

(73) Assignee: Fourte Design & Development, LLC, Sunol, CA (US)

( * ) Notice: Subject to any disclaimer, the term of this patent is extended or adjusted under 35 U.S.C. 154(b) by 0 days.

(21) Appl. No.: 12/384,008

(22) Filed: Mar. 30, 2009

Related U.S. Application Data

(63) Continuation of application No. 11/899,696, filed on Sep. 7, 2007, now abandoned.

(51) Int. Cl.
*G02B 6/36* (2006.01)

(52) U.S. Cl. .............................. 385/88; 385/89; 385/92; 385/135

(58) Field of Classification Search ............. 385/76–78, 385/88, 89, 92; 398/135–139
See application file for complete search history.

(56) References Cited

U.S. PATENT DOCUMENTS 6,533,603 B1* 3/2003 Togami ...................... 439/372
6,872,010 B1* 3/2005 Bianchini .................... 385/92
7,059,887 B1* 6/2006 Liu ............................. 439/372
7,064,959 B2* 6/2006 Kim ............................ 361/732
7,347,711 B1* 3/2008 Bianchini et al. ........... 439/357
2003/0171033 A1 9/2003 Bright et al.
2003/0194190 A1 10/2003 Huang
2004/0219819 A1 11/2004 Di Mascio
2005/0059290 A1 3/2005 Ishigami et al.

OTHER PUBLICATIONS

Extended Search Report from European patent application No. 07010533.3-2217 dated Feb. 4, 2008.

* cited by examiner

*Primary Examiner*—Charlie Peng
*Assistant Examiner*—Mary A El Shammaa
(74) *Attorney, Agent, or Firm*—Carr & Ferrell LLP

(57) ABSTRACT

A fiber optic connector release mechanism that is used to release a transceiver module from a cage assembly includes a pivoting bail that operates a slide plate on the transceiver module. The locking mechanism comprises a locking projection on an underside of the module housing which mates with an aperture in a flexible locking tab on an underside of the cage. When the release mechanism is actuated, a flexible lifting tab on the slide plate is urged upward by a trailing edge of the locking projection on an underside of the module housing, which in turn moves the locking tab on the cage upward, thereby disengaging the locking tab from the locking projection.

5 Claims, 7 Drawing Sheets

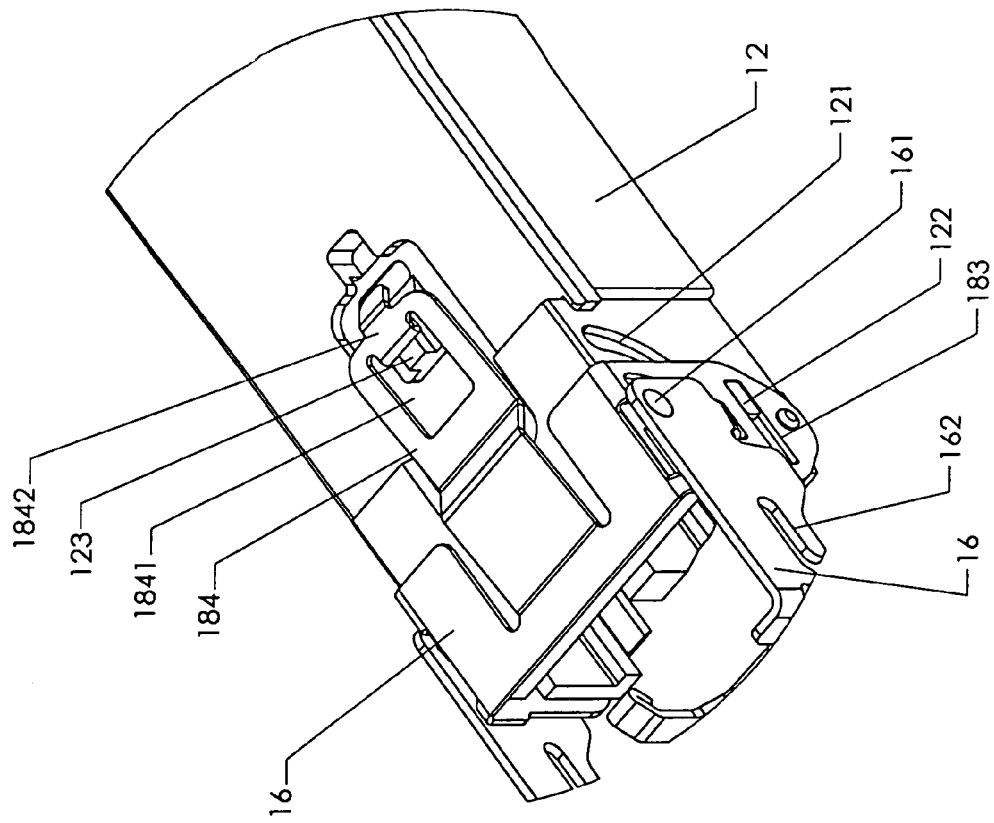
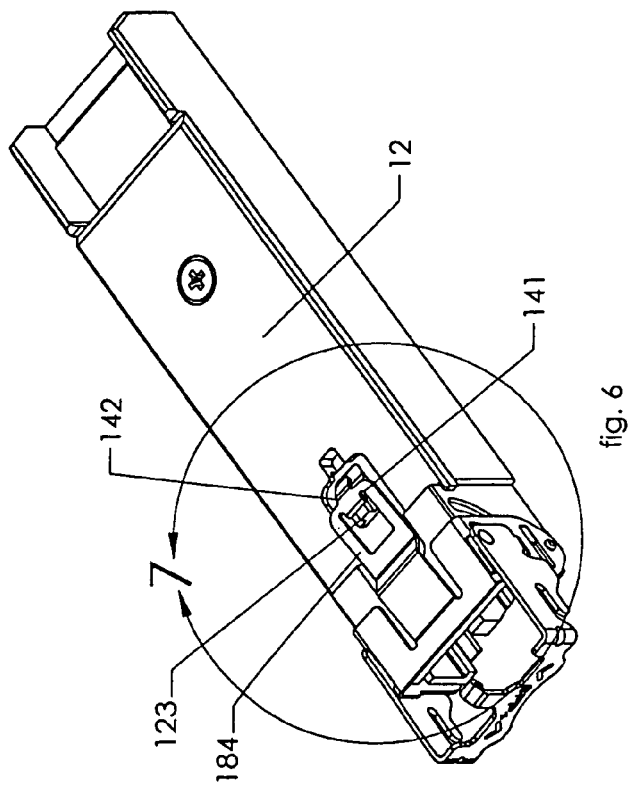
fig. 7
fig. 6

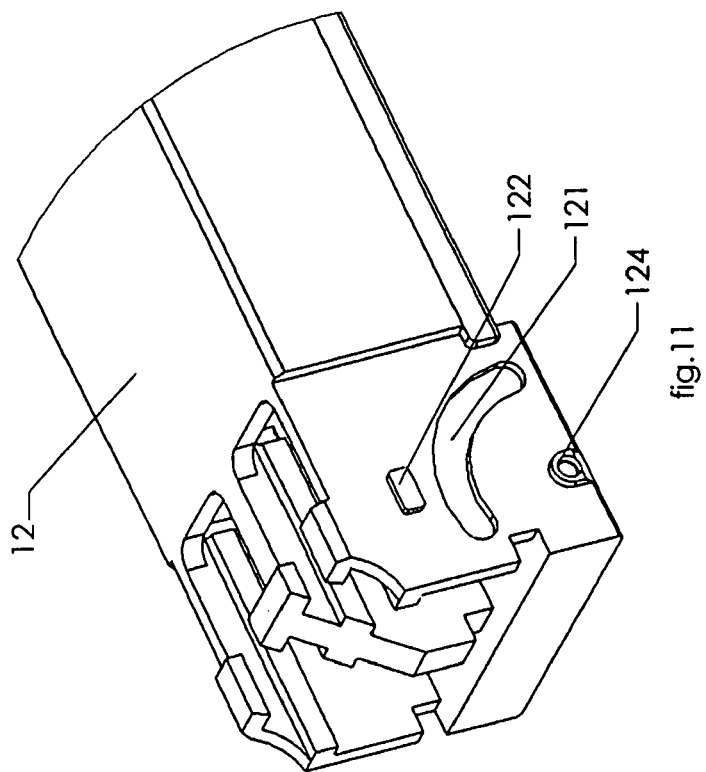
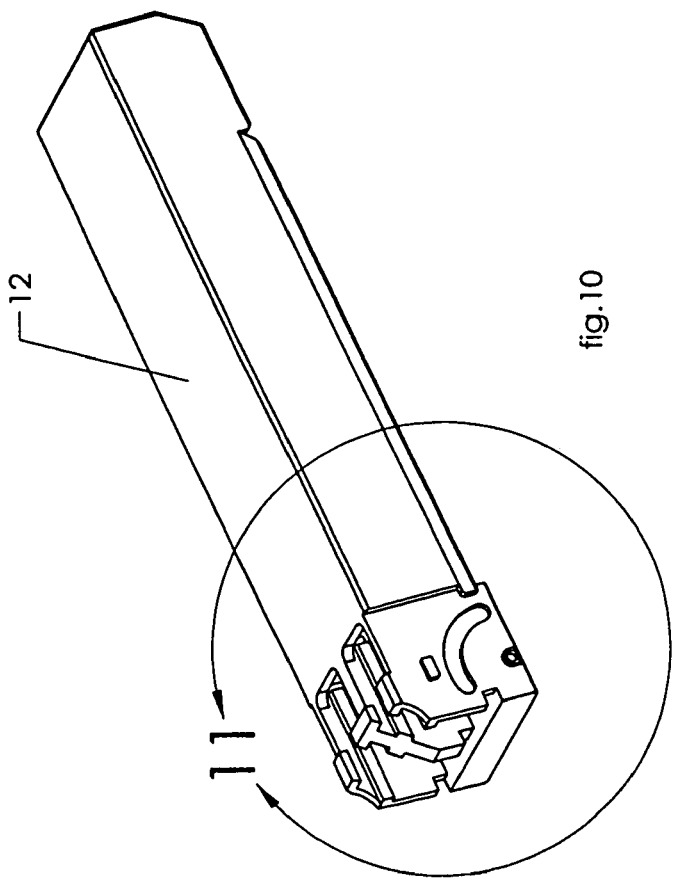

FIBER OPTIC MODULE RELEASE MECHANISM

This application is a continuation of Applicant's U.S. application Ser. No. 11/899,696, filed Sep. 7, 2007, now abandoned.

BACKGROUND OF THE INVENTION

1. Field of the Invention

The present invention relates generally to electronic module and connector devices, and more particularly is a fiber optic module release mechanism.

2. Description of the Prior Art

Computers and related peripheral equipment, as well as satellite and communication systems, have in the recent past evolved extremely rapidly. These systems require ever increasing data transfer rates to perform the highly complex tasks that drive the systems, such as digital signal processing, image analysis, and communications. With current demands, optical couplers are used to transfer signals over short and long distances between computers, between two circuit boards in one computer, and even between multiple chips on a single printed circuit board. The use of high speed optical signals in place of electrical interconnections increases the achievable data transfer rate.

An optical transmitter/receiver module typically includes both light emitting devices such as vertical cavity surface emitting lasers (VCSEL's) and light detecting devices such as photodiodes. Driver/receiver circuitry modules, typically in the form of application specific integrated circuit (ASIC) chips, include driver circuitry which receives electrical signals from one device and drives the VCSEL's in response. The ASIC also includes receiver circuitry for receiving signals from the photodiodes and, in response, for processing those signals into an appropriate output. The combination of the VCSEL's, the photodiodes, and the ASIC circuitry is commonly referred to as an optical transceiver.

As the density of the optical arrays increases, coupling a fiber optic cable to the arrays becomes an increasingly complex task. It is very important to align the active area of each emitter and detector with a corresponding fiber of the fiber optic bundle. The mechanical connection means therefore undergo a corresponding increase in importance. Fiber optic connectors are therefore of great interest in the current art. As such, improvements are always welcome in the reliability and ease of manufacturing of such connectors.

In the applications (IPF modules) which are the subject of the present invention, a pair of type LC plugs are received in a pair of bays in a fiber optic transceiver module housed in a cage assembly that is permanently mounted to a PCB. It is imperative for data integrity that the connector means hold the LC plugs in position during data transmission or receiving. If the user wants to remove the transceiver module from the cage, it is equally important that he be able to know whether or not the LC plugs are in use.

An example of the prior art in this field is the "Fiber Optic Connector Release Mechanism" by Gioni Bianchini, U.S. Pat. No. 6,872,010, issued Mar. 3, 2005, and assigned to Fourté Design and Development, LLC, of Sunol, Calif. This reference discloses a different release mechanism, and is directed to different products, than is the current device.

Another patent related to the device of the present invention is the "Small Form-Factor Transceiver Module with Pull-to-Release" by Murr, et al., U.S. Pat. No. 6,881,095, issued Apr. 19, 2005, and assigned to Tyco Electronics Corporation of Middletown, Pa. The Murr device has a spring latch formed on a wall of the module housing that engages a latch tab. A pull release mounted on the module housing has a release member that extends outward. As the pull release is actuated and moved to a fully released position, the spring latch is disengaged from the latch tab, allowing the transceiver to be removed from the housing. The movement of the pull release is provided by the pulling motion of the user only.

It is an object of the present invention to provide a module release mechanism that provides a locking position, and a triggering means to move the module from the installed position to a released position.

It is another object of the present invention to provide a connector with a release handle formed with a one piece construction for superior rigidity and release stability.

It is another object of the present invention to provide a release mechanism that is very simple to manufacture.

It is still another object of the present invention to provide a foolproof positive check on inadvertent removal of the transceiver module while the LC plugs are still in place.

SUMMARY OF THE INVENTION

The present invention is a fiber optic connector release mechanism. The release mechanism is used to release a transceiver module from a cage assembly that is permanently mounted on a printed circuit board. The connector release mechanism comprises a pivoting bail that operates a slide plate on the transceiver module, the release mechanism releasing a locking tab on the cage from a locking projection on an underside of the transceiver module. The bail rotates through a releasing arc of approximately 90° from a locked position to a released position. When the bail is in the locked position, the transceiver module is fully seated and locked in place in the cage. When the bail is moved to the released position, the locking mechanism is disengaged, and the transceiver module is released from the cage. The bail cannot travel through the releasing arc unless the LC plugs have been removed from the transceiver module.

The locking mechanism comprises a locking projection on an underside of the module housing which mates with an aperture in a flexible locking tab on an underside of the cage. When the release mechanism is actuated, a flexible lifting tab on the slide plate is urged upward by a trailing edge of the locking projection on an underside of the module housing. As the lifting tab moves forward and upward, it moves the locking tab on the cage upward, thereby disengaging the locking tab from the locking projection on the transceiver module. The transceiver module is then released from the cage.

An advantage of the present invention is that the two piece release mechanism provides a means to smoothly remove the transceiver module from the cage.

Another advantage of the present invention is that the locking mechanism provides seating of the transceiver module.

Still another advantage of the present invention is that it provides a safeguard against premature removal of the transceiver module.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 6 is an underside perspective view of the transceiver module with the bail in the released position.

FIG. 7 is a detail view of the area circled in FIG. 6.

FIG. 10 is a side view of the transceiver module with the bail and slide plate removed.

FIG. 11 is a detail view of the area circled in FIG. 10.

DETAILED DESCRIPTION OF THE INVENTION

Figure 1:
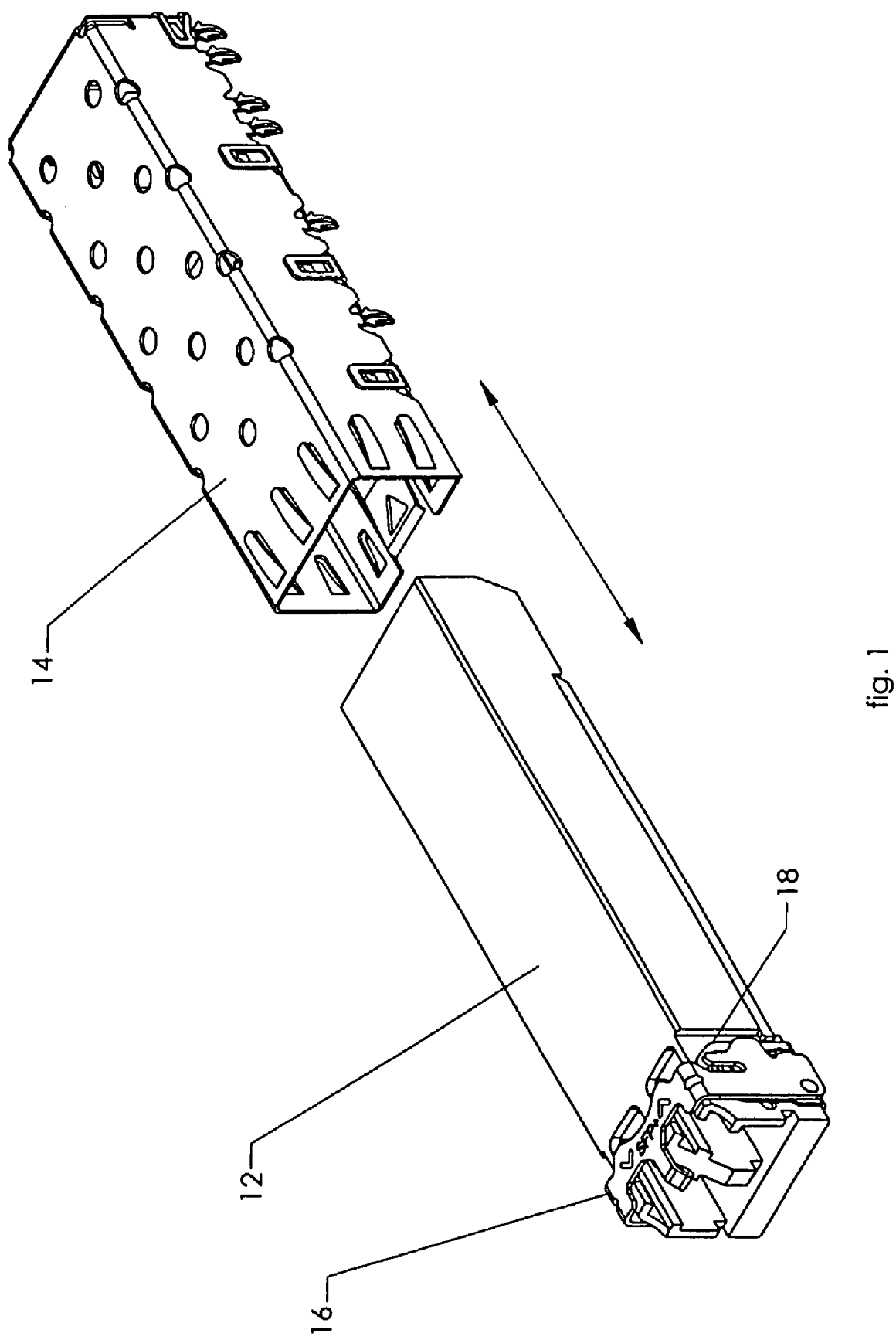
FIG. 1 is a perspective view of a transceiver module with a release mechanism according to the present invention in position to be installed in a cage assembly.
Figure 2:
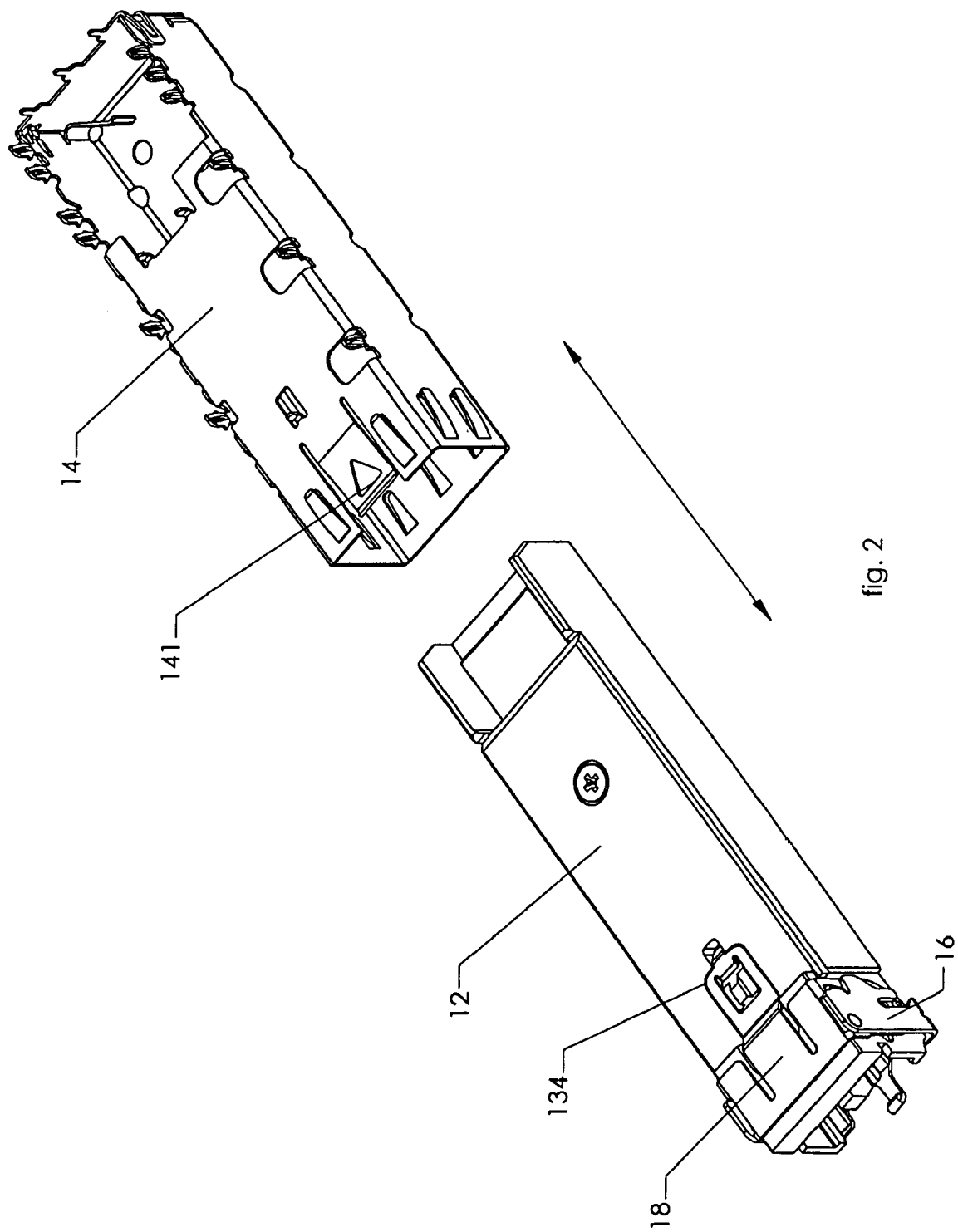
FIG. 2 is an underside perspective view of the transceiver module and the cage assembly.

The present invention is a fiber optic module release mechanism. The release mechanism is used on a transceiver module 12 housed in a cage assembly 14 that is permanently mounted on a printed circuit board (not shown).

The release mechanism comprises a pivoting bail 16 that works in conjunction with a slide plate 18. These elements are shown in detail in FIGS. 5-9. The bail 16 is mounted on pivot axes 161 that are received in pivot mounting sockets 124 on the module 12. The bail 16 further comprises a slot 162 that receives a boss 181 protruding from the slide plate 18 to form a catch means that retains the bail 16 in the locked position.

The bail 16 further includes a tab 163 that extends through an opening 182 in the slide plate 18 and into a travel arc 121 in the module 12. The tab 163 contacts the sides of the opening 182 to cause the slide plate 18 to move when the bail 16 is rotated. The travel path of the tab 163 is defined by the travel arc 121 (90° in the preferred embodiment) in the transceiver module 12.

The slide plate 18 travels on a pair of slide plate mounts 122 that extend outward from the sides of the transceiver module 12. The slide plate mounts 122 are received in slide travel slots 183 in the slide plate 18. The slide travel slots 183 define the travel path of the slide plate 18.

Figure 4:
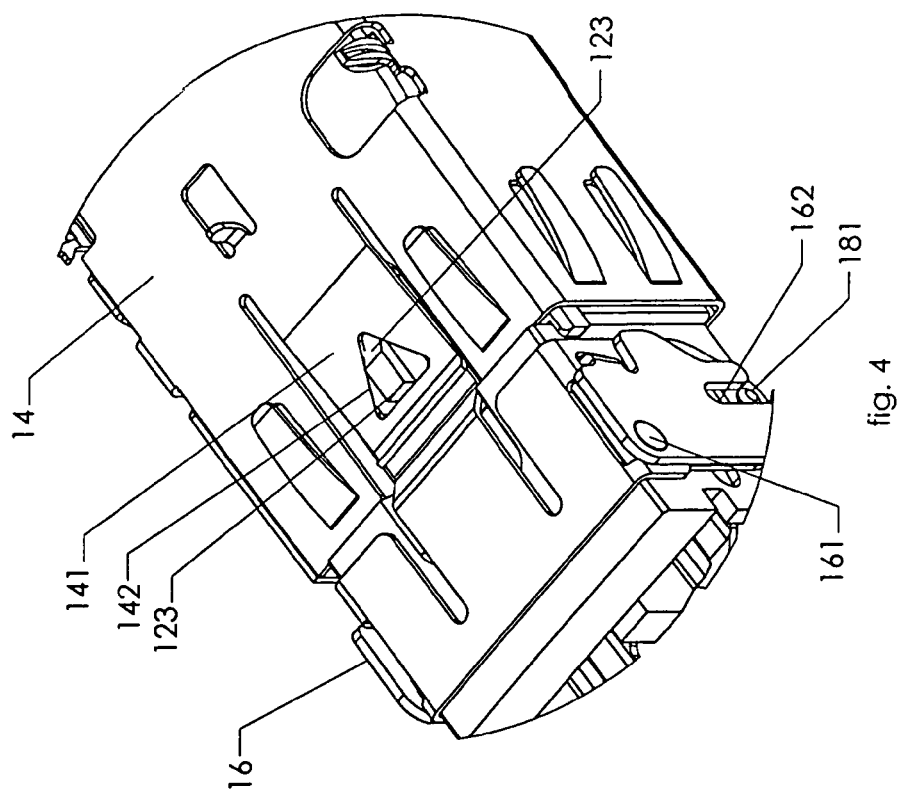
FIG. 4 is a detail view of the area circled in FIG. 3.
Figure 3:
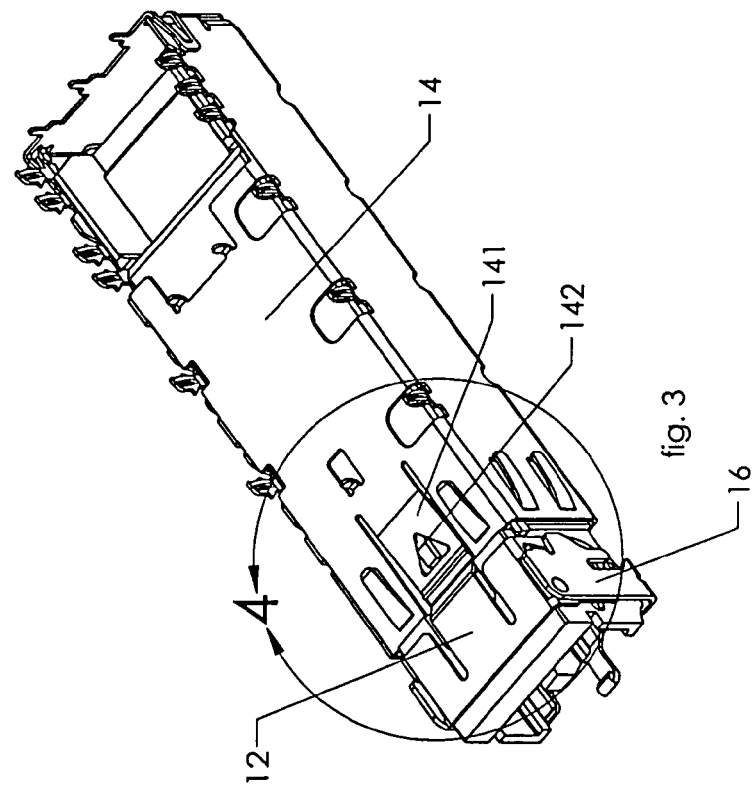
FIG. 3 is a perspective view of the transceiver module installed in the cage.
Figure 5:
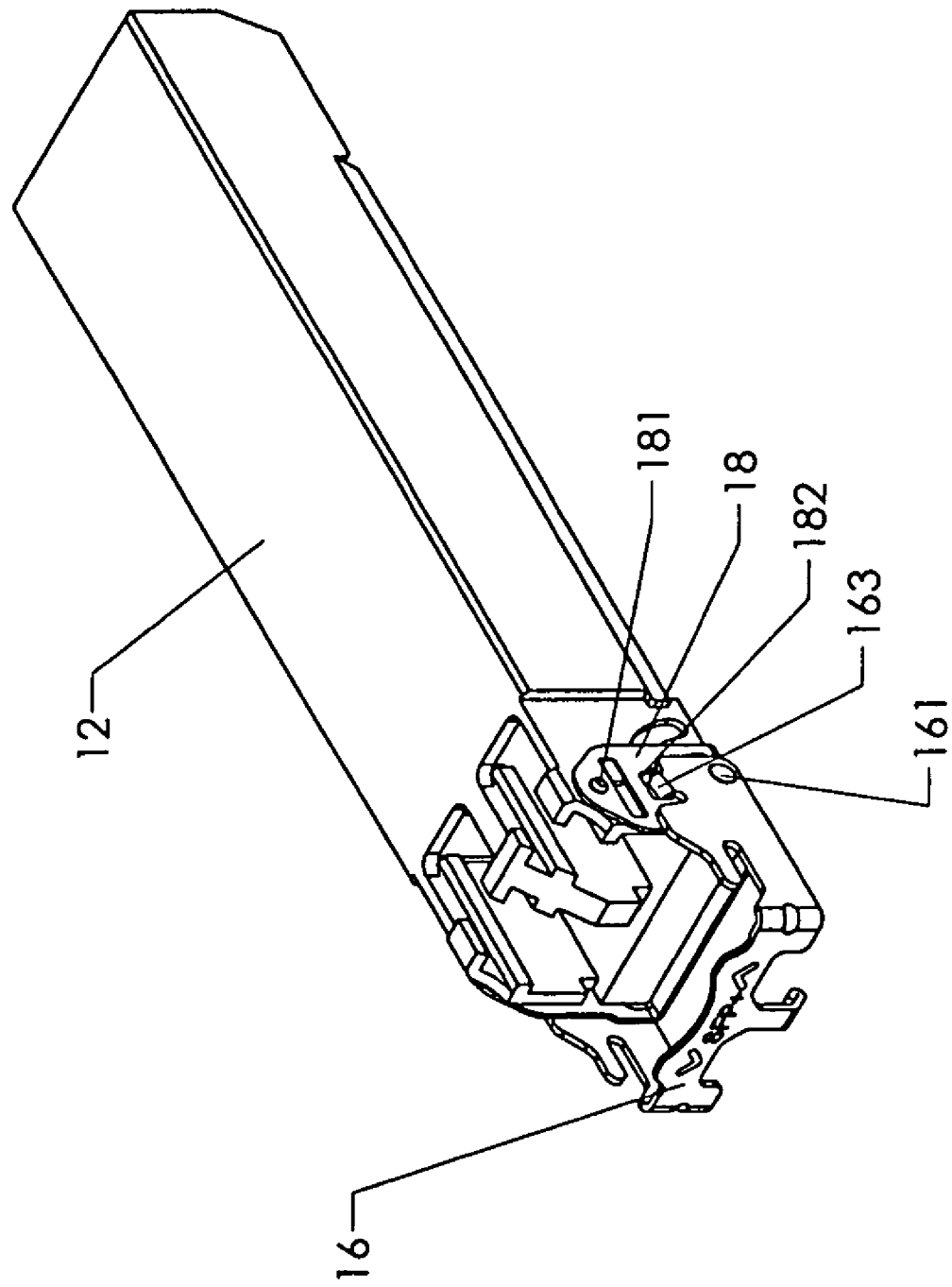
FIG. 5 is a perspective view of the transceiver module with the bail in the released position.
Figure 8:
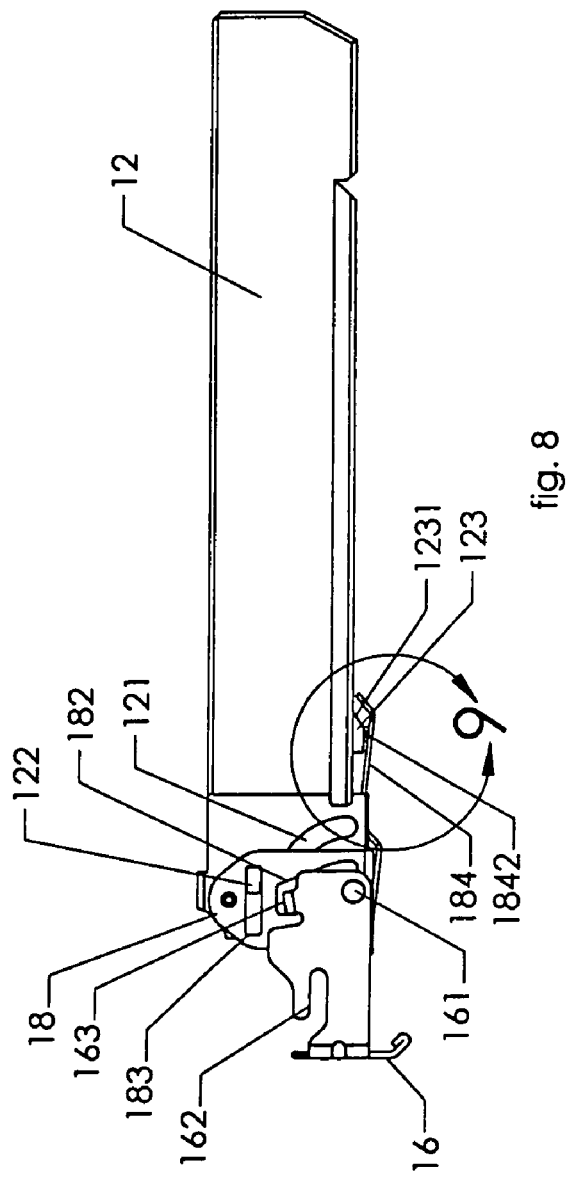
FIG. 8 is a side view of the transceiver module with the bail in the released position.
Figure 9:
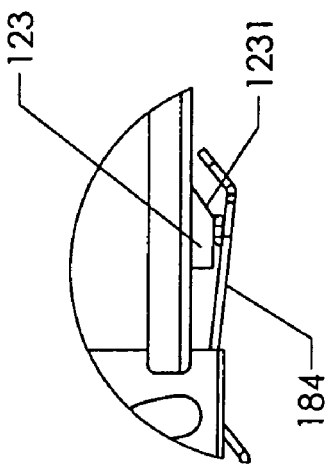
FIG. 9 is a detail view of the area circled in FIG. 8.

The slide plate 18 further includes a flexible lifting tab 184. The lifting tab 184 has a central projection opening 1841 that allows a locking projection 123 on the module 12 to protrude through the slide plate 18. A front edge of the locking projection 123 on the module 12 mates with a front edge of the locking aperture 142 on the locking tab 141 of the cage assembly 14. When the locking projection 123 is engaged with the locking aperture 142 (see FIG. 4), the transceiver module 12 cannot move forward relative to the cage assembly 14. A rear side of the locking projection 123 forms a beveled ramp 1231 to provide a raising surface for the lifting tab 184 of the slide plate 18 during the release process described below. The lifting tab 184 includes a reinforced contact area 1842 that slides up the rear side 1231 of the locking projection 123 and pushes against the locking tab 141 of the cage 14 as the module 12 is being released.

FIGS. 1-4 illustrate a transceiver module 12 and a cage 14 with the bail 16 in the locked position. When the bail 16 is in the locked position, the transceiver module 12 is fully seated and locked in place in the cage assembly 14. When the module 12 is to be removed from the cage 14, a user rotates the bail 16 forward. As forward pressure is applied to the bail 16, the boss 181 on the slide plate 18 disengages from the slot 162 in the bail 16. This releases the bail 16 from its locked position, enabling the bail 16 to travel forward through the first part of the releasing arc.

As the bail 16 continues to pivot with the tab 163 in the travel arc 121 of the transceiver module 12, the tab 163 contacts a leading edge of the opening 182 in the slide plate 18. Further forward rotation of the bail 16 then causes tab 163 to move the slide plate 18 forward. As the slide plate 18 moves forward, the contact area 1842 of the lifting tab 184 slides up the beveled ramp 1231, thereby raising the lifting tab 184.

As the lifting tab 184 moves forward and upward, the contact area 1842 of the lifting tab 184 lifts the locking tab 141 on the cage assembly 14. When the locking tab 141 is raised, it is released from the locking projection 123 on the transceiver module 12, allowing the module 12 to slide out of the cage assembly 14.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A module release mechanism in combination with a transceiver module housed in a cage assembly comprising:
   a bail; and
   a slide plate movably mounted on the transceiver module, a tab on the bail extending through an arced slot formed in the slide plate and being received in a travel arc formed in the transceiver module so that when the bail is moved from a locked position to an unlocked position, the tab moves through the travel arc and urges the slide plate forward, the slide plate moving relative to the transceiver module, the movement of the slide plate actuating the module release mechanism.

2. The release mechanism of claim 1, wherein the transceiver module includes at least one axis mounting socket to receive a pivot axis of the bail.

3. The release mechanism of claim 1, wherein the transceiver module includes mounts for the slide plate.

4. The release mechanism of claim 1, wherein the transceiver module includes mounts for the slide plate and at least one axis mounting socket to receive a pivot axis of the bail.

5. The release mechanism of claim 1, wherein when the bail is moved from the locked position, the slide plate is actuated by the bail, the slide plate moving forward relative to the transceiver module so that a lifting tab of the slide plate contacts an angled or arced surface of a locking projection on the transceiver module, a contact area of the slide plate contacting a locking tab of the cage assembly, the contact area disengaging the locking tab from the locking projection and releasing the transceiver module from the cage assembly.

* * * * *